(12) United States Patent
Paragyios (10) Patent No.: US 7,317,831 B2
(45) Date of Patent: Jan. 8, 2008

(54) METHOD AND SYSTEM FOR USER-AIDED BOUNDARY DELINEATION THROUGH THE PROPAGATION OF IMPLICIT REPRESENTATIONS

(75) Inventor: Nikolaos Paragyios, Paris (FR)

(73) Assignee: Siemens Medical Solutions USA, Inc., Malvern, PA (US)

(*) Notice: Subject to any disclaimer, the term of this patent is extended or adjusted under 35 U.S.C. 154(b) by 619 days.

(21) Appl. No.: 10/985,747

(22) Filed: Nov. 10, 2004

(65) Prior Publication Data

US 2005/0123196 A1    Jun. 9, 2005

Related U.S. Application Data

(60) Provisional application No. 60/520,450, filed on Nov. 14, 2003.

(51) Int. Cl.
*G06K 9/34* (2006.01)
(52) U.S. Cl. ........................ 382/173; 382/100
(58) Field of Classification Search ............... 382/100, 382/173, 176, 203, 240, 128, 180; 713/176, 713/179; 380/28, 207; 348/E7.061; 375/E7.075
See application file for complete search history.

(56) References Cited

U.S. PATENT DOCUMENTS 6,385,329 B1 * 5/2002 Sharma et al. .............. 382/100
7,068,809 B2 * 6/2006 Stach ........................ 382/100

* cited by examiner

*Primary Examiner*—Anh Hong Do
(74) *Attorney, Agent, or Firm*—Donald B. Paschburg; F. Chau & Associates, LLC (57) ABSTRACT

A method of incorporating user supplied information in level-set based image segmentation includes providing a digital image comprising a plurality of intensities corresponding to a domain of points, providing an embedding function on the image domain, obtaining from a user a control point in the image, selecting two end points from the image, the end points being in a level set of the embedding function, interpolating an interactive segment from the user supplied control point and the two end points, replacing a curve segment in the level set between the two endpoints with the interactive segment to form a shape constraint, and time-evolving the embedding function so as to minimize the difference between the level set of the embedding function and the shape constraint.

23 Claims, 4 Drawing Sheets

FIG. 1

User-Interactive Segmentation. (a) model-based segmentation, (b) user adjustments in the form of two control points.

METHOD AND SYSTEM FOR USER-AIDED BOUNDARY DELINEATION THROUGH THE PROPAGATION OF IMPLICIT REPRESENTATIONS

CROSS REFERENCE TO RELATED UNITED STATES APPLICATIONS

This application claims priority from "User-aided Boundary Delineation through the Propagation of Implicit Representations", U.S. Provisional Application No. 60/520,450 of Nikos Paragios, filed Nov. 14, 2003, the contents of which are incorporated herein by reference.

TECHNICAL FIELD

The invention is directed to incorporation of user-defined segmentation constraints within the level set methods used in medical imaging.

DISCUSSION OF THE RELATED ART

Variational and level set methods have many applications in image analysis, including segmentation, restoration, impainting, tracking, shape from shading, and 3D reconstruction. Image segmentation approaches can be classified into boundary-based methods that rely on the generation of a strength image and the extraction of prominent edges, and region based methods that rely on the homogeneity of spatially localized features and properties. The boundary-based methods are usually implemented using snake-driven techniques while the region-based methods are generally implemented using either region-growing techniques or Markov Random Field based approaches.

Boundary-based approaches can also be separated into parametric methods, where the segmentation map is obtained by fitting a parametric boundary template to the image, and non-parametric methods, where the segmentation map is obtained by the propagation of curves. Level set methods are boundary-based segmentation techniques. The idea behind the level set formulation is to consider the problem in a higher dimension and represent the evolving boundary as the zero-level set of an embedding function. The evolution of this function can then be derived in a straightforward manner from the original flow that guides the propagation of the boundary.

Such methods are implicit, intrinsic and topology free, leading to a natural handling of important shape deformations. However, level-set methods suffer from being sensitive to noise and can fail to capture/encode in a trivial manner the prior knowledge on the structure to be recovered. This limitation can be partially addressed in the form of a geometric flow that evolves the solution closer to the prior and in the form of an energy component that constrains the solution space. Another form of prior knowledge in the segmentation process comes from user-interaction.

Figure 2:
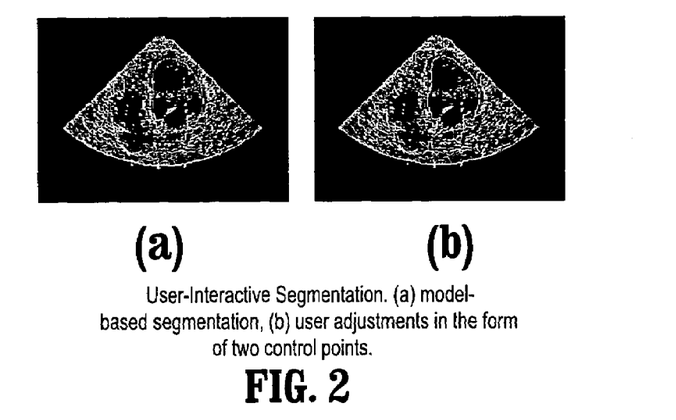
FIGS. 2(a)-(b) depict the results of model-based segmentation with user adjustments.

Automated segmentation techniques often require local corrections when a visual inspection does not support the automated solution. User interaction is a common technique to address this issue. One example is the segmentation of cardiac ultrasonic images. The high signal-to-noise ratio can lead to segmentation discrepancies. Correcting these results takes less time than hand-drawing the cardiac contours, which is a standard procedure. The outcome of this process is shown in FIGS. 2(a) and (b), where an initial segmentation is provided to the user who makes corrections with minimal edits.

Level set methods are techniques for performing segmentation through the propagation of curves. Propagation is performed at the pixel level and therefore global shape consistency constraints require special handling. User interactive editing tools can be considered either as local or global constraints. One method of utilizing such interactions are user-defined control points. In this situation, the user is asked to introduce some constraints on critical or misclassified parts of the segmentation map. However, although level set methods are an established segmentation technique in medical imaging, they do not currently support user interaction.

SUMMARY OF THE INVENTION

Disclosed herein is a term to encode user-interaction within level set methods. This term is introduced in the form of an evolving shape prior that transforms user-edits to level set-based propagation constraints. For this purpose, user-interaction is converted to a signed Euclidean distance map. The degrees of importance of the constraints are weighted by the distance from the user edits. Interaction is then encoded by seeking the minimal distance between the user-defined level set and the evolving contour while respecting the influence of data driven boundary and region segmentation components.

The disclosed methods are independent from the segmentation algorithm that is used to derive the first-stage segmentation map, and can be considered as refinement to those algorithms, and, for example, can be combined with model-based segmentation methods.

In one aspect of the invention, there is provided a method of incorporating user supplied information in level-set based image segmentation, said method comprising the steps of providing a digital image, wherein said image comprises a plurality of intensities corresponding to a domain of points in a D-dimensional space, and providing a D dimensional embedding function on the image domain, obtaining from a user a control point in the image, selecting two end points from the image, said end points being in a level set of the embedding function, interpolating an interactive segment from the user supplied control point and the two end points, replacing a curve segment in the level set between the two endpoints with the interactive segment to form a shape constraint, and time-evolving the embedding function so as to minimize the difference between the level set of the embedding function and the shape constraint.

In a further aspect of the invention, the method comprises the step of the user selecting a plurality of control points, wherein said interactive segment is approximated in a piece-wise manner from the plurality of control points.

In a further aspect of the invention, the step of replacing a curve segment in the level set between the two endpoints with the interactive segment further comprises selecting points from the level set curve of the embedding function, and replacing those points between the end points with points on the interactive segment.

In a further aspect of the invention, the endpoints are selected from a set $N_p$ of points $p_i$ on the level set curve that lie a predetermined distance d from the control point, said set defined by $$N_p = \{p_i \in \Omega : |\Phi(p)+d| < \delta\},$$

wherein $\delta \to 0$, $\Omega$ is the image domain, and $\Phi$ is the embedding function, and wherein the endpoints $(p_l, p_r)$ are chosen to be maximally far apart in said set.

In a further aspect of the invention, a level set for the shape constraint is defined from the embedding function $$\Phi_C(p) = \begin{cases} 0, & p \in \partial UI \\ +D((p), \partial UI) > 0, & p \in R_{UI} \\ -D((p), \partial UI) < 0, & p \in |\Omega - R_{ui}|, \end{cases}$$

wherein $\partial UI$ is the interactive segment, $R_{UI}$ is the shape constraint, and $D((p),\partial UI)$ is minimum Euclidean distance between the pixel p and the curve $\partial UI$.

In a further aspect of the invention, the effect of the interactive segment in the image is weighted by a function $\sigma_C(p)=1+|p-\hat{p}|$, wherein $\hat{p}$ is the control point, and p is a point in the image.

In a further aspect of the invention, wherein the user has selected a plurality of control points, the effect of the interactive segment in the image is weighted is according to the minimum distance of a given image location from the set of control points, defined by a function $$\sigma_C(p)=1+\text{argmin}_i|p-\hat{p}_i|,$$

wherein $\hat{p}_i$ is one of the plurality of control points, and p is a point in the image.

In a further aspect of the invention, the step of time-evolving the embedding function is defined by the formula $$\frac{d}{dt}\Phi = -2H_a(\Phi)\frac{\Phi - \Phi_C}{\sigma_C^2},$$

wherein $\Phi$ is the embedding function, $\Phi_C$ is the shape constraint, $\sigma_C$ is a weighting factor that reduces the effect of the shape constraint at image points away from the user supplied control point, and $H_a$ is the Heavyside step function $$H_a(\Phi) = \begin{cases} 1, & \Phi > a \\ 0, & \Phi < -a \\ \frac{1}{2}\left(1 + \frac{\Phi}{a} + \frac{1}{n}\sin\left(\frac{\pi\Phi}{a}\right)\right) & |\Phi| < a. \end{cases}$$

In a further aspect of the invention the method includes the step of combining the shape constraint with boundary-driven and region-driven terms in order to segment the image.

In another aspect of the invention, there is provided a program storage device readable by a computer, tangibly embodying a program of instructions executable by the computer to perform the method steps for incorporating user supplied information in level-set based image segmentation.

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Level Sets

Figure 1:
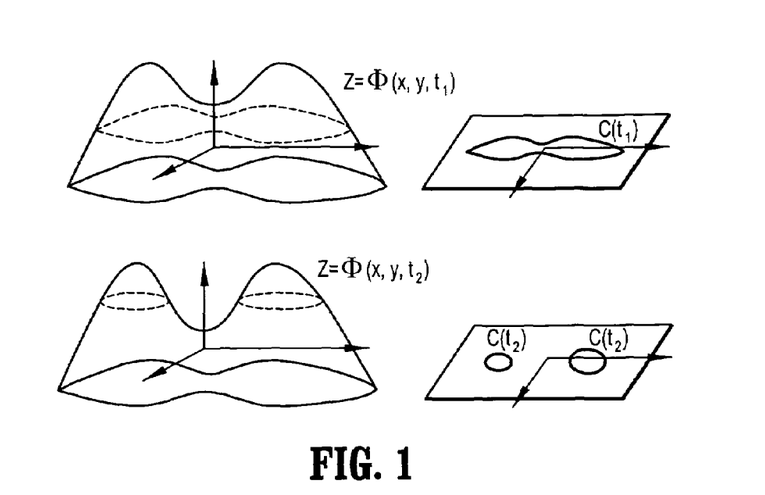
FIG. 1 illustrates level set representations and evolving interfaces.

The methods presented herein are directed toward evolving a parameterized, closed curve $\partial R(p, t)$ in the Euclidean plane. The time evolution of such a curve can be represented by $$\partial R(p, 0) = \partial R_0(p),$$

$$\frac{d}{dt}\partial R(p, t) = F(K(p))N(p),$$

where F is a scalar function of a geometric property of the curve, such as the curvature K, and N is an inward normal. These parameterized, closed curves can be regarded as being embedded in an evolving surface, as shown in FIG. 1. For example, let $\Phi$ be a function from $R^2$ to R, such that $[(x,y,\Phi(x,y,t))\in R^3]$, then the time evolution of $\Phi$ can be represented by $$\begin{cases} \Phi(\partial R_0(p), 0) = 0 \\ \frac{d}{dt}\Phi(p) = F(K(p))|\nabla\Phi(p)|, \end{cases}$$

where $[|\nabla\Phi|]$ is the norm of the gradient, and $$N = -\frac{\nabla\Phi}{|\nabla\Phi|}.$$

This establishes a connection between the family of curves $\partial R(p,t)$ and the family of one-parameter surfaces $\Phi(x,y,t)$ where the zero iso-surface of $\Phi$ yields the evolving interface curve $\partial R$.

The embedding surface $\Phi$ remains a function as long as F is smooth while the evolving interface $\partial R$ can change topology. In addition, numerical simulations on $\Phi$ can be developed and the intrinsic geometric properties of the evolving curve can be estimated directly from the level set function. In one embodiment of the invention, the embedding function is the (Euclidean) distance transforms, although other choices are within the scope of the invention.

Figure 6:
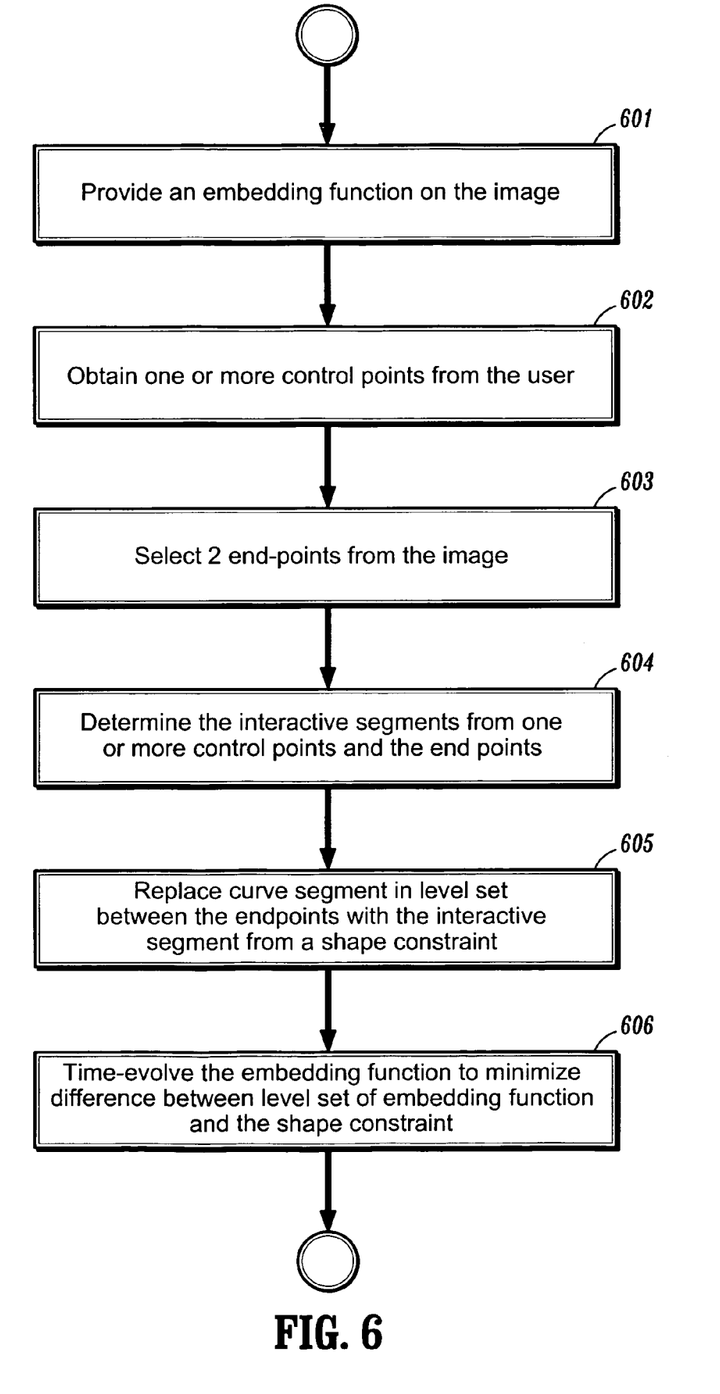
FIG. 6 presents a flow chart of a preferred method of the invention

Referring now to FIG. 6, define at step 601 an embedding function $\Phi:\Omega \mapsto R^+$, a Lipschitz function that maps an image domain $\Omega$ comprising a bounded set of pixels (or voxels for 3D images) to a set of positive, real intensities. In one embodiment, the Euclidean distance function can be defined as $$\Phi(p;t) = \begin{cases} 0, & p \in \partial R(t) \\ +D((p), \partial R(t)) > 0, & p \in R(t) \\ -D((p), \partial R(t)) < 0, & p \in [\Omega - R(t)] \end{cases}$$

where $D(p,\partial R(t))$ is the minimum Euclidean distance between the pixel p and the curve $\partial R(p)$. This embedding function is exemplary and non-limiting, and any other embedding function $\Omega \mapsto R^+$ is within the scope of the invention.

This embedding function can be incorporated with boundary-driven and region-driven terms and used in an optimization framework, as disclosed below. For this purpose, one can use the Dirac and Heavyside distributions:

$$\delta_a(\phi) = \begin{cases} 0, & |\phi| < a \\ \frac{1}{2a}\left(1 + \cos\left(\frac{\pi\phi}{a}\right)\right) & |\phi| > a \end{cases}$$

$$H_a(\phi) = \begin{cases} 1, & \phi > a \\ 0, & |\phi| < -a \\ \frac{1}{2}\left(1 + \frac{\phi}{a} + \frac{1}{\pi}\sin\left(\frac{\pi\phi}{a}\right)\right) & |\phi| < a \end{cases}$$

It can easily be shown that $\{p \in \Omega : \lim_{a \to 0^+}[H_a(\Phi(p,t))]=1\}=R$ $\{p \in \Omega : \lim_{a \to 0^+}[\delta_a(\Phi(p,t))]=1\}=\partial R.$ These functions can be used to define a contour-based as well as a region-based energetic modules for the evolving curve in the level set space:

$$\iint_\Omega H_a(\Phi(p))r(I(p))dxdy, \qquad (i)$$

$$\iint_\Omega \delta_a(\Phi(p))b(I(p))|\nabla\Phi((p)|dxdy \qquad (ii)$$

where r and b are region and boundary positive monotonically decreasing data-driven functions, and I represents the observed image. The first term (i) is a grouping component that accounts for regional properties (modulo the definition of r) of the area defined by the evolving curve. The second term (ii) is a combination of a boundary attraction term (modulo the definition of b) and a smoothness component.

Constructing the Constraint

Figure 3:
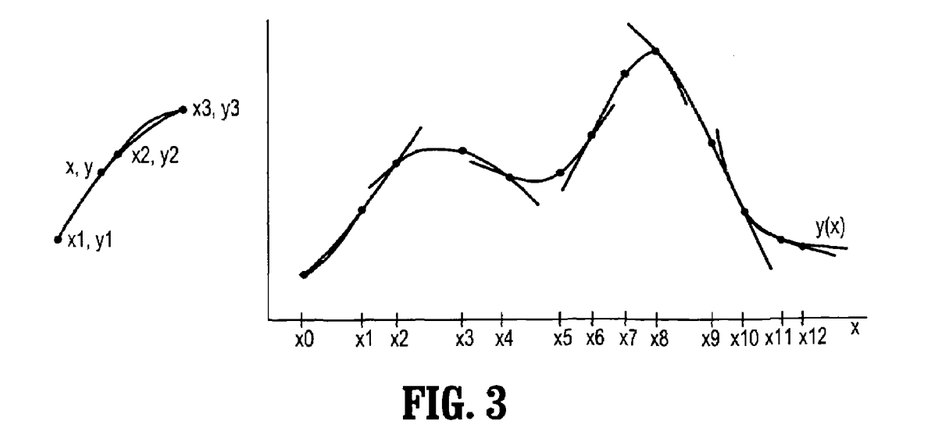
FIG. 3 depicts quadratic interpolation and piece-wise curve fitting.

In order to derive shape constraints within a level set framework, these constraints need to be converted into closed structures (shapes). Curve fitting techniques such as linear or quadratic interpolation can be used to provide connected shape segments from a limited number of control points. In one embodiment, quadratic interpolation, depicted in the left panel of FIG. 3, can be used to find the value of a function at an unknown intermediate point given three data points. Essentially, we are fitting a parabola to the three data points and then evaluating for y. The general equation of the parabola is $y=Ax^2+Bx+C$, where A, B, and C are unknowns to be solved in fitting the parabola. The given data points, $(x_{i-1}, y_{i-1})$, $(x_i, y_i)$, and $(x_{i+1}, y_{i+1})$ must all lie on the curve and are used to determine the three unknowns A, B, and C. The most compact method of determining the unknown parameters of the parabola is using the determinants, leading to:

$$A = \frac{\Delta_a}{\Delta}, \quad B = \frac{\Delta_b}{\Delta}, \quad C = \frac{\Delta_c}{\Delta},$$

where $$\Delta = \begin{vmatrix} x_{i-1}^2, x_{i-1}, 1 \\ x_i^2, x_i, 1 \\ x_{i+1}^2, x_{i+1}, 1 \end{vmatrix}, \Delta_a = \begin{vmatrix} y_{i-1}, x_{i-1}, 1 \\ y_i, x_i, 1 \\ y_{i+1}, x_{i+1}, 1 \end{vmatrix},$$

$$\Delta_b = \begin{vmatrix} x_{i-1}^2, y_{i-1}, 1 \\ x_i^2, y_i, 1 \\ x_{i+1}^2, y_{i+1}, 1 \end{vmatrix}, \text{ and } \Delta_c = \begin{vmatrix} x_{i-1}^2, x_{i-1}, y_{i-1} \\ x_i^2, x_i, y_i \\ x_{i+1}^2, x_{i+1}, y_{i+1} \end{vmatrix}.$$

Quadratic interpolation is exemplary, and other curve fitting techniques, such as linear interpolation, and cubic splines, are within the scope of the invention.

Single Control Point

In one embodiment of the invention, a user provides at step 602 an independent control point to correct for local discrepancies. In other embodiments, disclosed below, the user can provide a plurality of control points. The single control point can be used, for example, where segmentation maps fail to capture local details due to the absence of strong visual support. This can be addressed by forcing the solution to go through the problematic segment. Regularity constraints on the continuity of the solution and a single point from the user are sufficient to correct such local discrepancies.

In order to construct a corrected curve segment from the user interaction, two endpoints are selected at step 603. In order to determine the endpoints, consider those points that lie within a distance d from the user-defined control point $\hat{p}$. This distance should be greater than the minimum distance between the curve and the control point: $d=D(\hat{p},\partial R(t))+\epsilon$. These points can be defined by $N_{\hat{p}}=\{p_i \in \Omega : |\Phi(p)-d|<\delta\}$ where $\delta \to 0$. This definition assumes that the control point lies in the interior of the data-driven solution. For a control point that lies in the background, this definition can be modified to be $N_{\hat{p}}=\{p_i \in \Omega : |\Phi(p)+d|<\delta\}.$ In general, more than two points will satisfy the condition for $N_{\hat{p}}$. Thus, two points (pl, pr) on the curve are selected that create a maximum angular separation at the control point. Given that their distances d from the user seed are the same, finding these points from $N_{\hat{p}}$ is equivalent with finding the set of points that are maximally far apart:

$(p_l, p_r)=\text{argmax}_{\{i,j\}}|p_i-p_j|, (p_l, p_r) \in N_{\hat{p} \times N_{\hat{p}}}.$ These two points, along with the one provided by the user, are used at step 604 to determine the interactive segment through an interpolation scheme. The interactive segment that serves as the corrected curve segment can be represented as $UI=(p_r, q_1, \ldots, q_M, p_l)$. The curve can be extracted from the zero-level set of the embedding function. The curve points are four-connected (zero-crossings on the image plane), and using a simple connected component rule, can be recovered in a clock-wise order:

$$\partial R=(p_0, \ldots, p_r, \ldots, p_l, \ldots p_N)$$

where $p_0$ is an arbitrarily selected point. Note that the order here is arbitrary, and a counter-clockwise ordering, or any other ordering, is within the scope of the invention. Then, the user interactive constraint is recovered in the form of a closed structure by replacing at step 605 the curve segment between $p_l$ and $p_r$ with the one determined by the interpolation between the control point $\hat{p}$ and $p_l$ and $p_r$:

$$\partial UI=(p_0, \ldots, p_r, q_1, \ldots, q_M, p_l, \ldots, p_N).$$

The result is a shape constraint, denoted by $R_{UI}$, that incorporates the user input. A level set function can be constructed for this shape using the Euclidean distance as embedding function:

$$\Phi_C(p) = \begin{cases} 0, & p \in \partial UI \\ +D((p), \partial UI) > 0, & p \in R_{UI} \\ -D((p), \partial UI) < 0, & p \in |\Omega - R_{ui}|. \end{cases}$$

This representation encodes the user input in a global fashion using the actual solution in areas where user interaction is absent. In these areas, deviations from the constraint can be tolerated. The distance between the control point and the image plane serves as an indicator for the importance of the constraint:

$$\sigma_C(p)=1+|p-\hat{p}|, p\in\Omega$$

This distance will be small for the interactive segment while it will be large for those segments that are far from the user edits.

Multiple Control Points

In another embodiment of the invention, a user provides at step 602 a sequence of multiple connected points. For expository purposes, this sequence of points can be considered to be in a clock-wise order. However, a sequence of points in a counter-clock-wise order is within the scope of this invention. A sequence of points can provide a global constraint that can be used to guide the segmentation process from the very beginning. This is useful when a data-driven solution cannot recover a meaningful segmentation map requires significant user input to correct errors.

In this embodiment, a user provides a minimum number of control points in a particular order $(\hat{p}_1, \ldots, \hat{p}_N)$ that can be connected and that define a closed curve. The end points can be determined as before at step 603. Using these points, a global constraint can be recovered at step 604 in the form of a closed curve that goes through the control points. This closed curve can approximate the original function in a piecewise fashion, as shown in the right panel of FIG. 3. For any y over the entire domain of x, one selects the proper segment to perform the interpolation. Since the shape functions are only defined on each element, y can be approximated for any arbitrary point x as $$y(x)=\alpha_{i-1}(x)y_{i-1}+\beta_i(x)y_i+\gamma_i(x)y_{i+1},$$

where $\hat{p}_i=(x_i,y_i)$ and $$\alpha_{i-1}(x) = \frac{(x_{i+1} - x_i)(x_{i+1} - x)(x - x_i)}{\Delta}$$

$$\beta_i(x) = \frac{-(x_{i+1} - x_{i-1})(x_i - x)(x - x_{i-1})}{\Delta}$$

$$\gamma_{i+1}(x) = \frac{(x_i - x_{i-1})(x_i - x)(x - x_{i-1})}{\Delta},$$

where $\nabla$ is defined as above. This approximation can convert user interactive input into a closed structure (shape) $R_{UI}$ at step 605, as in the single control point embodiment, above. The level set representation $\Phi_C$ of this structure encodes the user input.

As in the case of independent control points, the importance of the constraint varies across the image domain. The control points are considered equally and the importance of the interactively defined structure is determined according to the minimum distance of a given image location from the set of control points:

$$\sigma_C(p)=1+arg \min_i|p-\hat{p}_i, p\in\Omega, i\in[1,N].$$

Incorporating the Constraint

The user-defined constraints are satisfied when the evolving level set representation converges at step 606 to the level set derived from the constraint. This difference can be represented by the distance between the constraint and the evolving curve $\Phi$:

$$E(\Phi)=\int\int_\Omega H_a(\Phi(x, y))(\Phi(x, y)-\Phi_C(x,y))^2 d\Omega.$$

One finds a curve that goes through the user-defined seed points by minimizing the distance between the evolving curve and the interactive constraint.

The importance of the user defined constraint within the evolving level set is based on the distance from the control points. Thus, the user defined constraint should be more strictly enforced closer to the user seeds, while using the image data to guide the segmentation process when there is no user input. The distance between the constructed prior and the control points of the constraint can be used to implement such strategy:

$$E_{interaction}(\Phi) = \int\int_\Omega H_a(\Phi(x, y))\frac{(\Phi(x, y) - \Phi_C(x, y))^2}{\sigma_C^2(x, y)} d\Omega.$$

This user interaction distance can be used to find the $\Phi$ that corresponds to the lowest potential of the objective function. Using the calculus of variations within a gradient descent method can derive the optimal flow that forces the evolving curve to respect the user-defined constraints:

$$\frac{d}{dt}\Phi = -2H_a(\Phi)\frac{\Phi - \Phi_C}{\sigma_C^2} - \delta_a(\Phi)\frac{(\Phi - \Phi_C)^2}{\sigma_C^2}$$

This flow includes two terms. The first term evolves the curve locally towards the preferred topology as defined by the user. The second term is a constant deflation force that tends to shrink the interface and consequently minimize the objective function. Therefore, the second term can be ignored, and only the first term need be used to account for the user interaction:

$$\frac{d}{dt}\Phi = -2H_a(\Phi)\frac{\Phi-\Phi_C}{\sigma_C^2}.$$

The proposed flow enforces the preferred topology in a qualitative fashion. The variability ($\sigma_C$) of the interaction constraint is used to reduce the effect of that term in image locations far from the user input. Propagation/segmentation in these areas will be data-driven.

The next step is to combine the user defined constraint with image data to complete the segmentation. To do this, one needs to include a boundary-driven term a region-driven term. Using the calculus of variations, one can derive the time evolution of the functional $$E(\Phi)=\omega_1 E_{boundary}(\Phi)+\omega_2 E_{region}(\Phi)+\omega_3 E_{int\ eraction}(\Phi),$$

to obtain a flow that will converge the initial curve towards object boundaries, so as to partition the image. The minimum of this functional then corresponds to an optimal grouping of the observed visual information according to a pre-determined criteria, such as homogeneity.

The interaction term and its time evolution equation have been derived above. The boundary term can be represented as, using the Dirac delta function:

$$E_{boundary}(\Phi)=\int\int_\Omega \delta_a(\Phi)b(|\nabla I|)|\nabla\Phi|d\Omega$$

where b: $R^+\to[0,1]$ is a monotonically decreasing function, and I is the observed image. The lowest potential of this functional corresponds to a minimal length geodesic curve attracted by the boundaries of the structure of interest. The time evolution of the boundary term is:

$$\frac{d}{dt}\Phi = \delta_a(\Phi)b(|\nabla I|)div\frac{\nabla\Phi}{|\nabla\Phi|} + \delta_a(\Phi)\nabla b(|\nabla I|)\frac{\nabla\Phi}{|\nabla\Phi|}.$$

The regional term can be represented by, using the Heavyside step function, $$E(\Phi)=\int\int_{106}[H_a(\Phi)r_O(I)+(1-H_a(\Phi))r_B(I)]d\Omega,$$

where $r_O$: $R^+\to[0,1]$, $r_B$: $R^+\to[0,1]$, are monotonically decreasing region descriptor functions, and I is the observed image. These descriptors measure the quality of matching between the observed image and the expected regional properties of the structure of interest, and the observed image and the background, respectively. The time evolution of the regional term is given by:

$$\frac{d}{dt}\Phi = \delta_a(\Phi)(r_o(I) - r_B(I)).$$

One approximation of regional term uses the piece-wise constant function $$E_{region}(\Phi)=\int\int_\Omega [H_a(\Phi)(I-\mu_0)^2+(1-H_a(\Phi))(1-\mu_B)^2]d\Omega,$$

where $\mu_B$, $\mu_0$ represent the mean intensity of the background and of the object region, respectively, and the distance from the mean value represents the region descriptor. The mean values can be dynamically updated according to the evolving segmentation map.

The curve propagation flow thus defined integrates image data with user defined constraints. Modification of the user preferences can update the constraint on-the-fly. Thus, a solution is first derived from the image data, then the user introduces seeds (points) for corrections. This interaction is converted to a propagation force that refines the segmentation map towards the user preferred solution with minimal edits. The final solution is an equilibrium between the user edits and the solution provided by the image data.

Figure 4:
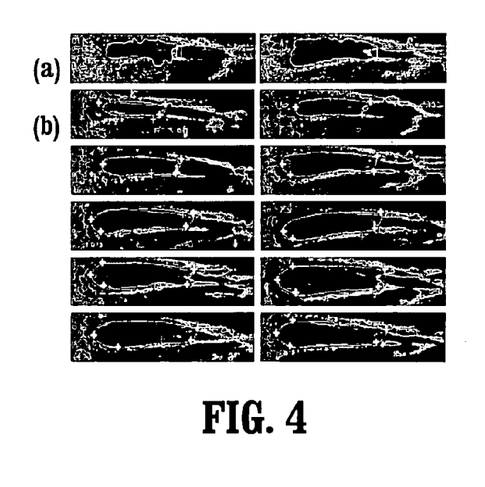
FIG. 4 illustrates user-interactive segmentation versus manual segmentation.

Experimental results presented in FIG. 4 demonstrate the potentials of these methods for interactive segmentation. This figures compares user-interactive segmentation with manual segmentation involving more that twenty edits for the left ventricle in ultrasonic polar images for different subjects. The user edits correspond to the crosses that appear in the image. Ultrasonic images suffer from high signal-to-noise ratio and visual support is not sufficient to provide accurate segmentation results. Global interactive constraints have been used to improve segmentation performance of the polar domain (5 points; 2 points on the valve and 3 points on the apex). Row (a) of the figure presents constraints on the valve, while row (b) presents constraints on the valve and the apex.

Figure 5:
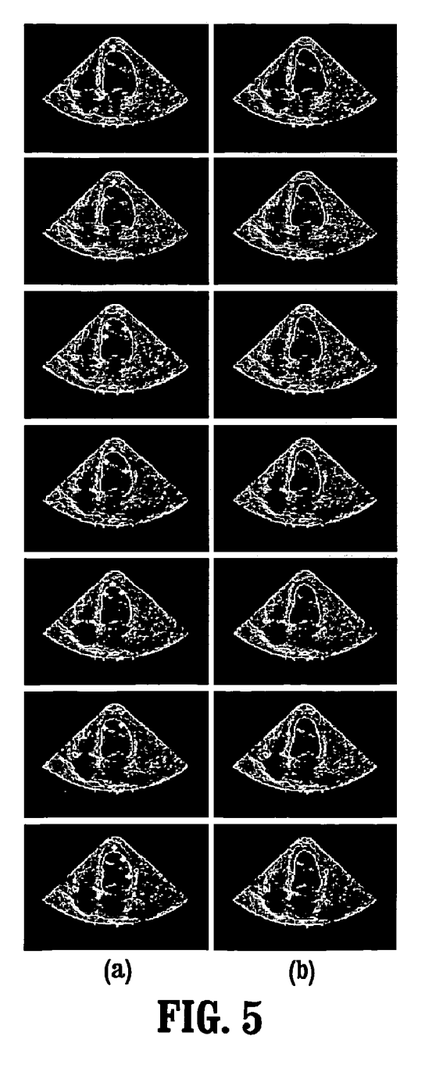
FIG. 5 illustrates the refinement of a level set method that respects global constraints.

The methods presented herein are also suitable for refining segmentation while respecting global constraints. For example, as shown in FIG. 5, a global model-based approach is used to recover a rough segmentation of ultrasonic images of the left ventricle while local editing (2-3 points) along with image-based terms have been used to improve the final solution. Column (a) of the figure presents a model-based solution, while column (b) presents the user-interactive segmentation for the left ventricle in ultrasonic row images, using the same subject, in the temporal domain, with two/three edits.

System Implementations

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
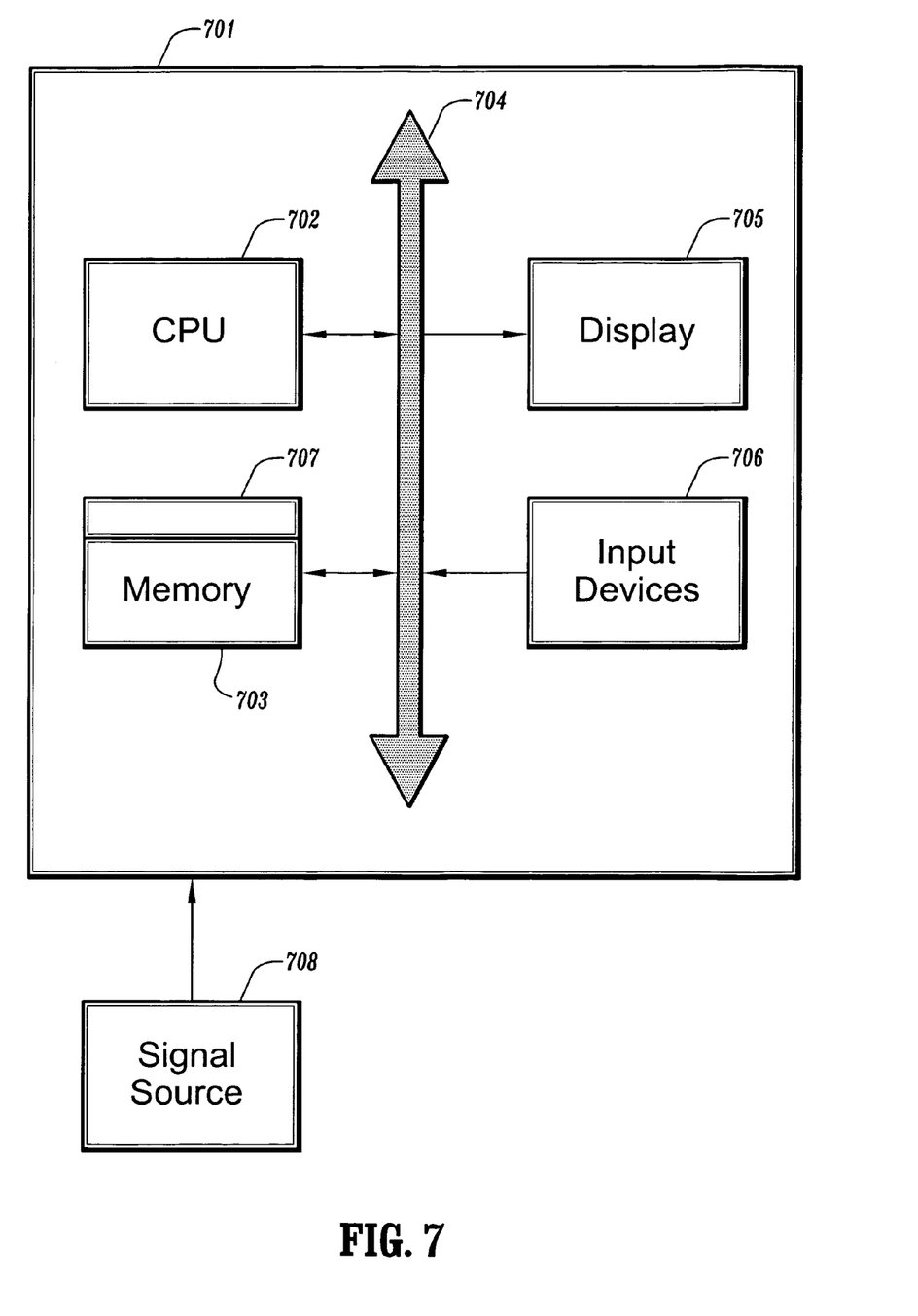
FIG. 7 presents a schematic block diagram of a system that can implement the methods of the invention.

Referring now to FIG. 7, according to an embodiment of the present invention, a computer system 701 for implementing the present invention can comprise, inter alia, a central processing unit (CPU) 702, a memory 703 and an input/output (I/O) interface 704. The computer system 701 is generally coupled through the I/O interface 704 to a display 705 and various input devices 706 such a's a mouse and a keyboard. The support circuits can include circuits such as cache, power supplies, clock circuits, and a communication bus. The memory 703 can include random access memory (RAM), read only memory (ROM), disk drive, tape drive, etc., or a combinations thereof. The present invention can be implemented as a routine 707 that is stored in memory 703 and executed by the CPU 702 to process the signal from the signal source 708. As such, the computer system 701 is a general purpose computer system that becomes a specific purpose computer system when executing the routine 707 of the present invention.

The computer system 701 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of incorporating user supplied information in level-set based image segmentation, said method comprising the steps of:
   providing a digital image, wherein said image comprises a plurality of intensities corresponding to a domain of points in a D-dimensional space;
   providing a D dimensional embedding function on the image domain;
   obtaining from a user a control point in the image;
   selecting two end points from the image, said end points being in a level set of the embedding function;
   interpolating an interactive segment from the user supplied control point and the two end points;
   replacing a curve segment in the level set between the two endpoints with the interactive segment to form a shape constraint; and
   time-evolving the embedding function so as to minimize the difference between the level set of the embedding function and the shape constraint.

2. The method of claim 1, further comprising the step of the user selecting a plurality of control points, wherein said interactive segment is approximated in a piecewise manner from the plurality of control points.

3. The method of claim 1, wherein the step of replacing a curve segment in the level set between the two endpoints with the interactive segment further comprises:
selecting points from the level set curve of the embedding function, and replacing those points between the end points with points on the interactive segment.

4. The method of claim 1, wherein the endpoints are selected from a set $N_p$ of points $p_i$ on the level set curve that lie a predetermined distance d from the control point, said set defined by $$N_p = \{p_i \in \Omega : |\Phi(p) + d| < \delta\},$$

wherein $\delta \to 0$, $\Omega$ is the image domain, and $\Phi$ is the embedding function, and wherein the endpoints $(p_l, p_r)$ are chosen to be maximally far apart in said set.

5. The method of claim 1, wherein a level set for the shape constraint is defined from the embedding function $$\Phi_C(p) = \begin{cases} 0, & p \in \partial UI \\ +D((p), \partial UI) > 0, & p \in R_{UI} \\ -D((p), \partial UI) < 0, & p \in |\Omega - R_{ui}|, \end{cases}$$

wherein $\partial UI$ is the interactive segment, $R_{UI}$ is the shape constraint, and $D((p), \partial UI)$ is minimum Euclidean distance between the pixel p and the curve $\partial UI$.

6. The method of claim 1, wherein the effect of the interactive segment in the image is weighted by a function $\sigma_C(p) = 1 + |p - \hat{p}|$, wherein $\hat{p}$ is the control point, and p is a point in the image.

7. The method of claim 2, wherein the effect of the interactive segment in the image is weighted is according to the minimum distance of a given image location from the set of control points, defined by a function $$\sigma_C(p) = 1 + arg \min_i |p - \hat{p}_i|,$$

wherein $\hat{p}_i$ is one of the plurality of control points, and p is a point in the image.

8. The method of claim 1, wherein the step of time-evolving the embedding function is defined by the formula $$\frac{d}{dt}\Phi = -2H_a(\Phi)\frac{\Phi - \Phi_C}{\sigma_C^2},$$

wherein $\Phi$ is the embedding function, $\Phi_C$ is the shape constraint, $\sigma_C$ is a weighting factor that reduces the effect of the shape constraint at image points away from the user supplied control point, and $H_a$ is the Heavyside step function $$H_a(\Phi) = \begin{cases} 1, & \Phi > a \\ 0, & \Phi < -a \\ \frac{1}{2}\left(1 + \frac{\Phi}{a} + \frac{1}{\pi}\sin\left(\frac{\pi\Phi}{a}\right)\right) & |\Phi| < a. \end{cases}$$

9. The method of claim 1, further comprising the step of combining the shape constraint with boundary-driven and region-driven terms in order to segment the image.

10. A program storage device readable by a computer, tangibly embodying a program of instructions executable by the computer to perform the method steps for incorporating user supplied information in level-set based image segmentation, said method comprising the steps of:
    providing a digital image, wherein said image comprises a plurality of intensities corresponding to a domain of points in a D-dimensional space;

providing a D dimensional embedding function on the image domain;

obtaining from a user a control point in the image;

selecting two end points from the image, said end points being in a level set of the embedding function;

interpolating an interactive segment from the user supplied control point and the two end points;

replacing a curve segment in the level set between the two endpoints with the interactive segment to form a shape constraint; and time-evolving the embedding function so as to minimize the difference between the level set of the embedding function and the shape constraint.

11. The computer readable program storage device of claim 10, wherein the method further comprises the step of the user selecting a plurality of control points, wherein said interactive segment is approximated in a piecewise manner from the plurality of control points.

12. The computer readable program storage device of claim 10, wherein the step of replacing a curve segment in the level set between the two endpoints with the interactive segment further comprises:

selecting points from the level set curve of the embedding function, and replacing those points between the end points with points on the interactive segment.

13. The computer readable program storage device of claim 10, wherein the endpoints are selected from a set $N_p$ of points $p_i$ on the level set curve that lie a predetermined distance d from the control point, said set defined by $$N_p = \{p_i \epsilon \Omega : |\Phi(p) + d| < \delta\},$$

wherein $\delta \to 0$, $\Omega$ is the image domain, and $\Phi$ is the embedding function, and wherein the endpoints $(p_l, p_r)$ are chosen to be maximally far apart in said set.

14. The computer readable program storage device of claim 10, wherein The method of claim 1, wherein a level set for the shape constraint is defined from the embedding function $$\Phi_C(p) = \begin{cases} 0, & p \in \partial UI \\ +D((p), \partial UI) > 0, & p \in R_{UI} \\ -D((p), \partial UI) < 0, & p \in |\Omega - R_{ui}|, \end{cases}$$

wherein $\partial UI$ is the interactive segment, $R_{UI}$ is the shape constraint, and $D((p),\partial UI)$ is minimum Euclidean distance between the pixel p and the curve $\partial UI$.

15. The computer readable program storage device of claim 10, wherein the effect of the interactive segment in the image is weighted by a function $\sigma_C(p)=1+|p-\hat{p}|$, wherein $\hat{p}$ is the control point, and p is a point in the image.

16. The computer readable program storage device of claim 11, wherein the effect of the interactive segment in the image is weighted is according to the minimum distance of a given image location from the set of control points, defined by a function $$\sigma_C(p)=1+\text{argmin}_i|p-\hat{p}_i|,$$

wherein $\hat{p}$ is one of the plurality of control points, and p is a point in the image.

17. The computer readable program storage device of claim 10, wherein the step of time-evolving the embedding function is defined by the formula $$\frac{d}{dt}\Phi = -2H_a(\Phi)\frac{\Phi - \Phi_C}{\sigma_C^2},$$

wherein $\Phi$ is the embedding function, $\Phi_C$ is the shape constraint, $\sigma_C$ is a weighting factor that reduces the effect of the shape constraint at image points away from the user supplied control point, and $H_a$ is the Heavyside step function $$H_a(\Phi) = \begin{cases} 1, & \Phi > a \\ 0, & \Phi < -a \\ \frac{1}{2}\left(1 + \frac{\Phi}{a} + \frac{1}{\pi}\sin\left(\frac{\pi\Phi}{a}\right)\right) & |\Phi| < a. \end{cases}$$

18. The computer readable program storage device of claim 10, wherein the method further comprises the step of combining the shape constraint with boundary-driven and region-driven terms in order to segment the image.

19. A method of incorporating user supplied information in level-set based image segmentation, said method comprising the steps of:

providing a digital image, wherein said image comprises a plurality of intensities corresponding to a domain of points in a D-dimensional space;

providing a D dimensional embedding function $\Phi$ on the image domain, obtaining from a user a control point in the image;

selecting two end points from a set $N_p$ of points $p_i$ on the level set curve that lie a predetermined distance d from the control point, said set defined by $$N_p = \{p_i \epsilon \Omega : |\Phi(p) + d| < \delta\},$$

wherein $\delta \to 0$, $\Omega$ is the image domain, and $\Phi$ is the embedding function, and wherein the endpoints $(p_l, p_r)$ are chosen to be maximally far apart in said set;

interpolating an interactive segment from the user supplied control point and the two end points;

selecting points from the level set curve of the embedding function;

replacing those points between the end points with points on the interactive segment, wherein a level set for the shape constraint is defined from the embedding function $$\Phi_C(p) = \begin{cases} 0, & p \in \partial UI \\ +D((p), \partial UI) > 0, & p \in R_{UI} \\ -D((p), \partial UI) < 0, & p \in |\Omega - R_{ui}|, \end{cases}$$

wherein $\partial UI$ is the interactive segment, $R_{UI}$ is the shape constraint, and $D((p),\partial UI)$ is minimum Euclidean distance between the pixel p and the curve $\partial UI$; and time-evolving the embedding function according to the formula $$\frac{d}{dt}\Phi = -2H_a(\Phi)\frac{\Phi - \Phi_C}{\sigma_C^2},$$

wherein $\Phi$ is the embedding function, $\Phi_C$ is the shape constraint, $\sigma_C$ is a weighting factor that reduces the effect of the shape constraint at image points away from the user supplied control point, and $H_a$ is the Heavyside step function $$H_a(\Phi) = \begin{cases} 1, & \Phi > a \\ 0, & \Phi < -a \\ \frac{1}{2}\left(1 + \frac{\Phi}{a} + \frac{1}{\pi}\sin\left(\frac{\pi\Phi}{a}\right)\right) & |\Phi| < a, \end{cases}$$

so as to minimize the difference between the level set of the embedding function and the shape constraint.

20. The method of claim 19, further comprising the step of the user selecting a plurality of control points, wherein said interactive segment is approximated in a piecewise manner from the plurality of control points.

21. The method of claim 19, wherein the effect of the interactive segment in the image is weighted by a function $\sigma_C(p)=1+|p-\hat{p}|$, wherein $\hat{p}$ is the control point, and p is a point in the image.

22. The method of claim 20, wherein the effect of the interactive segment in the image is weighted is according to the minimum distance of a given image location from the set of control points, defined by a function $\sigma_C(p)=1+\text{argmin}_i|p-\hat{p}_i|,$ wherein $\hat{p}_i$ is one of the plurality of control points, and p is a point in the image.

23. The method of claim 19, further comprising the step of combining the shape constraint with boundary-driven and region-driven terms in order to segment the image.

* * * * *